(No Model.)
N. A. NEWTON.
CARRIAGE GEAR COUPLING.
No. 511,541. Patented Dec. 26, 1893.
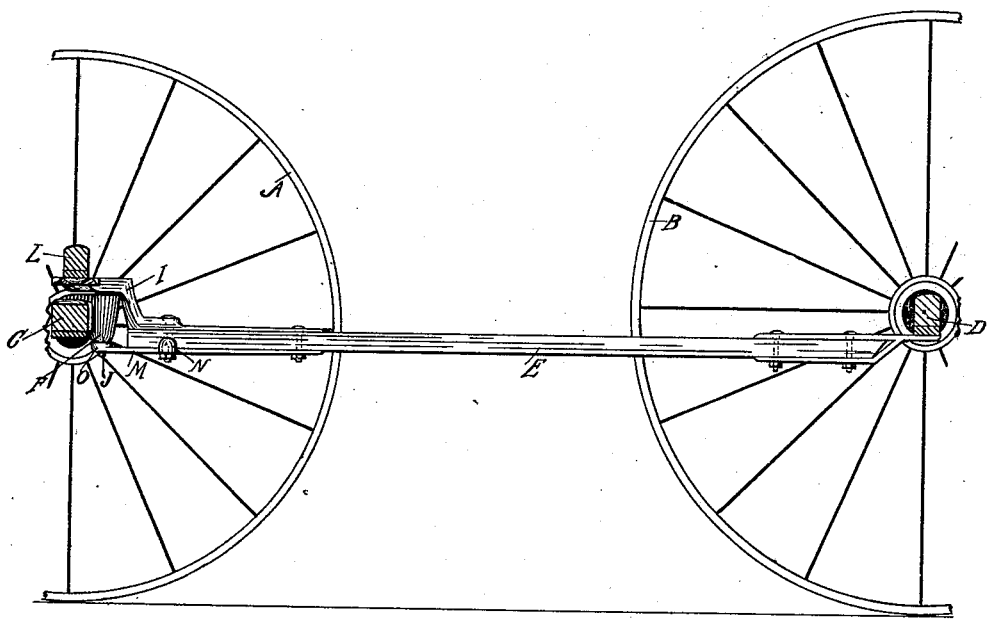
Fig. 1.
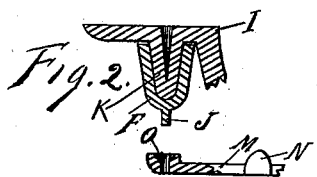
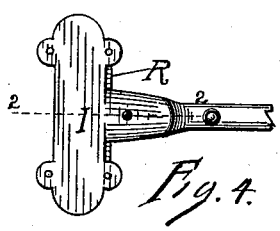
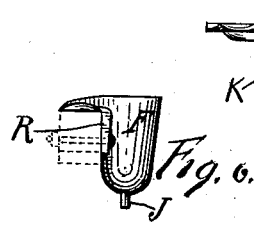
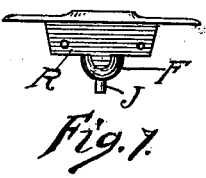
WITNESSES:
Clara C. Williams.
Cora C. Westbrook.
INVENTOR
Nelson A. Newton
BY Fred L. Chappell,
ATTORNEY.

UNITED STATES PATENT OFFICE.

NELSON A. NEWTON, OF KALAMAZOO, MICHIGAN.

CARRIAGE-GEAR COUPLING.

SPECIFICATION forming part of Letters Patent No. 511,541, dated December 26, 1893.

Application filed December 9, 1892. Serial No. 454,650. (No model.)

*To all whom it may concern:*

Be it known that I, NELSON A. NEWTON, a citizen of the United States, residing at the city of Kalamazoo, in the county of Kalamazoo and State of Michigan, have invented a certain new and useful Improvement in Carriage-Gear Couplings, of which the following is a specification.

My invention relates to improvements in carriage gear couplings; and more particularly to improvements in the gear couplings on which I obtained Letters Patent from the United States on July 5, 1892.

The objects of my invention are to make the couplings stronger and prevent any possibility of a displacement of the parts which is accomplished by the mechanism hereinafter described.

In the accompanying drawings Figure 1 is a vertical longitudinal section through a wagon gearing embodying my invention, taken in a plane a little to the nearer side of the reach and coupling. Fig. 2 is a view on line 2—2 of Fig. 4, the plate R being cut off. Fig. 3 is a detailed view of the end of the bar M. Fig. 4 is a perspective view of the coupling looking down. Fig. 5 is a perspective view of the bar attached to the upper side of the reach. Fig. 6 is a perspective side view of socket F; and Fig. 7 is a front perspective view of the socket F, showing its method of attachment to the axle of the vehicle.

Similar letters refer to similar parts throughout the several views.

A, B, C, D and E are the fore wheel, the hind wheel, the fore axle, the hind axle and the reach of a vehicle in ordinary form.

The coupling consists of three pieces and the necessary screws and bolts for attaching it to the vehicle. The bar T which is attached to the upper side of the reach E is bent up and forward and is expanded into a plate at the end. On the under side of the bar just back of the plate is a downwardly projecting conoidal pivot K integral with the bar. The part F contains a socket that corresponds to the pivot K and is attached to the axle of the vehicle by means of the angled plate R with which the socket is integral. At the lower end of the socket and integral with it is a pivot J. The bar M attached to the lower side of the reach E is provided with lugs N on the sides to give it a firm hold to the reach and the end besides being cup formed has a hole O in which the pivot J turns. The pivot J can be made conoidal or any other shape, its shape not being material to my invention. The bars M and I are bolted to the reach E, each bolt passing through both the bars M and I and the reach E as well. The socket F is attached to the front axle C by means of the angled plate R, one portion of the angled plate being horizontal and extending over the top of the axle and the other portion being vertical and on the rear side of the axle, bolts pass through both portions of the plate and through the axle at right angles and at right angles to each other to hold the plate firmly. This gives the socket greater strength and a firmer attachment to the axle than it otherwise would have. It will be clear on examination that the gear will turn just the same as though there were a king bolt down through the center of the conoidal pivot K and the pivot J through the opening O. The point of pivotal connection being back of the axle enables the vehicle to turn in a smaller space than it otherwise would. The bearings being conoidal in form will take up wear by their own weight and the pivot J at the bottom of the closed socket F will keep the conoidal pivot K from wearing to one side of the socket.

Of course my coupler is used on either a single or double reach as the case may be.

Having thus described my invention, what I claim as new, and desire to secure by Letters Patent, is—

1. A vehicle-gear coupling consisting of a reach-iron I provided with a downwardly facing conoidal pivot pin K, in combination with the upwardly facing socket F closed at the bottom and provided with pivot J, formed integral therewith, said socket F being adapted to receive pivot-pin K, and the bar M, having hole O, through which pivot J passes, the angle-iron R with which the said socket F is formed, and the front axle to which the said angle-iron R is attached, substantially as described.

2. In a vehicle-gear coupling, the combination of a conoidal oil-holding socket F closed at the bottom, and having a pivot J formed integral therewith, in combination with a conoidal pivot-piece fitting therein, a reach, a bar M on the under side thereof, having a cup with a perforation O to receive the pivot J, and the angle-plate R for attaching socket F to the front axle, substantially as described.

3. In a vehicle-gear coupling, the combination of the conoidal oil-holding socket F, having a right-angle attaching plate at its upper end, formed with a depending flange at its forward edge, fastening devices for the plate at right-angles to each other, for attachment to the front axle of a vehicle, and the pivot J, in one piece; the bar M on the under side of the reach with the bearing O for the pivot J, a bolster, and a connection between the bolster and reach, formed with a depending conoidal pivot pin seated in said conoidal socket, substantially as described.

In witness whereof I have hereunto set my hand and seal in the presence of two witnesses.

NELSON A. NEWTON. [L. S.]

Witnesses:
E. S. ROOS,
CORA E. WESTBROOK.